(12) United States Patent
Abel et al.

(10) Patent No.: US 8,321,315 B2
(45) Date of Patent: Nov. 27, 2012

(54) SYSTEM AND METHOD FOR CONSUMER CONTROL OVER CARD-BASED TRANSACTIONS

(75) Inventors: Luther C. Abel, San Jose, CA (US); Robert E. Cousins, Saratoga, CA (US)

(73) Assignee: Citizens Financial Group, Inc., Providence, RI (US)

( * ) Notice: Subject to any disclaimer, the term of this patent is extended or adjusted under 35 U.S.C. 154(b) by 32 days.

(21) Appl. No.: 12/842,859

(22) Filed: Jul. 23, 2010

(65) Prior Publication Data

US 2010/0288832 A1  Nov. 18, 2010

Related U.S. Application Data (63) Continuation of application No. 12/054,284, filed on Mar. 24, 2008, now Pat. No. 7,783,569, which is a continuation of application No. 11/197,920, filed on Aug. 5, 2005, now Pat. No. 7,359,880, which is a continuation of application No. 09/613,491, filed on Jul. 11, 2000, now abandoned.

(51) Int. Cl.
*G06Q 40/00* (2006.01)

(52) U.S. Cl. ............. 705/35; 705/26.7; 705/41; 705/44; 705/65; 235/380; 340/5.42

(58) Field of Classification Search .................. 705/26.7, 705/35, 44, 41, 65; 340/5.42; 235/380
See application file for complete search history.

(56) References Cited

U.S. PATENT DOCUMENTS

| | | | |
|---|---|---|---|
| 4,725,719 A | 2/1988 | Oncken et al. | |
| 5,177,342 A | 1/1993 | Adams | |
| 5,432,326 A * | 7/1995 | Noblett et al. | 235/380 |
| 5,477,040 A | 12/1995 | Lalonde | |
| 5,585,787 A * | 12/1996 | Wallerstein | 340/5.42 |
| 5,649,118 A | 7/1997 | Carlisle et al. | |
| 5,845,260 A | 12/1998 | Nakano et al. | |
| 5,884,271 A | 3/1999 | Pitroda | |
| 5,914,472 A | 6/1999 | Foladare et al. | |
| 5,953,710 A | 9/1999 | Fleming | |
| 5,999,596 A | 12/1999 | Walker et al. | |
| 6,047,270 A * | 4/2000 | Joao et al. | 705/44 |
| 6,111,522 A | 8/2000 | Hiltz et al. | |
| 6,149,055 A | 11/2000 | Gatto | |
| 6,363,363 B1 | 3/2002 | Haller et al. | |
| 6,427,911 B1 | 8/2002 | Barnes et al. | |
| 6,490,568 B1 | 12/2002 | O'Mara et al. | |

(Continued)

*Primary Examiner* — Harish T Dass
(74) *Attorney, Agent, or Firm* — DLA Piper LLP (US)

(57) ABSTRACT

A system and method for consumer control over card-based transactions and associated accounts. An interface is provided between a merchant or the merchant's bank and the bank or banks at which the consumer has accounts for card-based transactions. The interface acts as an intermediary which is accessible to the consumer so that the consumer may place a variety of controls on card-based transactions. For example, multiple transaction cards may be linked to a single credit account with each card having a different credit limit. As another example, each transaction card may be restricted to a particular merchant. As yet another example, a consumer may link several credit and/or debit accounts to a single transaction card; the consumer may pre-select criteria to be utilized for directing charges for a particular transaction to be applied the different accounts. The consumer may access the interface via a web site or a telephone for making changes and receiving account information. Flexibility and control over the use of transaction cards is, therefore, provided for card-based transactions and for debit and credit accounts used in connection with such card-based transactions.

8 Claims, 4 Drawing Sheets

U.S. PATENT DOCUMENTS

| | | |
|---|---|---|
| 6,529,725 B1 | 3/2003 | Joao et al. |
| 6,532,465 B2 | 3/2003 | Hartley et al. |
| 6,609,113 B1 | 8/2003 | O'Leary et al. |
| 6,658,568 B1 | 12/2003 | Ginter et al. |
| 6,871,186 B1 * | 3/2005 | Tuzhilin et al. .............. 705/26.7 |
| 6,999,943 B1 | 2/2006 | Johnson et al. |
| 7,194,437 B1 | 3/2007 | Britto et al. |
| 7,983,986 B1 | 7/2011 | Carragher et al. |
| 2001/0039535 A1 | 11/2001 | Tsiounis et al. |
| 2001/0047336 A1 | 11/2001 | Maycock et al. |

* cited by examiner

SYSTEM AND METHOD FOR CONSUMER CONTROL OVER CARD-BASED TRANSACTIONS

RELATED APPLICATIONS

This application is a continuation of U.S. patent application Ser. No. 12/054,284 filed on Mar. 24, 2008, now U.S. Pat. No. 7,783,569 which is a continuation of U.S. patent application Ser. No. 11/197,920 filed on Aug. 5, 2005 now U.S. Pat. No. 7,359,880, which is a continuation of U.S. patent application Ser. No. 09/613,491, filed on Jul. 11, 2000 now abandoned, both of which are incorporated herein by reference.

BACKGROUND OF THE INVENTION

The present invention relates to the field of card-based transactions and accounts. More particularly, the present invention relates to a method and apparatus for providing to a consumer increased control over his or her accounts for card-based transactions.

Retail merchants have granted charge privileges to their customers for centuries. Small stores, in which the proprietor dealt personally with customers, characterized retail trade until about a century ago. When a customer wanted to charge a purchase, the owner simply made an entry in a ledger book to record their purchase.

The last years of the nineteenth century and beginning years of the twentieth century saw the rise of the department store. These giant, new stores became popular with consumers by offering a wide variety of merchandise under one roof.

Department store owners realized that they needed to grant charge privileges just like small shops. But rather than interacting with a small store's proprietor directly, consumers now interacted with a new type of employee, a sales clerk. Sales clerks at large, busy department stores could hardly be expected to know each customer by name the way small shop owners did.

This led to the development of the charge card, a wallet-sized card that identified customers as having a charge account at the store and provided either their name and address or an account number linked to them. Charge cards quickly evolved into metal plates with the consumer's identification embossed on them so that it could be imprinted on a cash register receipt or charge slip.

Starting in the late 1950s and early 1960s, a new type of card appeared, bank-issued credit cards. These cards had two unique features: they were issued by banks with the intention that they could be used at a variety of stores, restaurants, and other retail establishments; and they were credit cards rather than charge cards. They offered the consumer a line of personal credit and did not have to be paid in full every month, as did charge accounts. Since the 1980s, even more forms of cards have appeared: automated teller machine (ATM) cards and debit cards. In contrast to credit cards, these cards directly debit the owner's bank account for a transaction. Collectively, these different types of cards can be referred to as transaction cards, examples of which include debit, ATM, credit, charge, and entertainment cards. Use of these transaction cards can be referred to as card-based transactions.

Transaction card usage is so universal today that according to the Nilson Report, an industry newsletter, 96% of all retail transactions in the United States involve the use of transaction cards. As credit and other forms of transaction cards spread, issuers (typically banks) quickly banded together into associations that could accept and clear transactions from other member banks, allowing cards to be used across wide geographic areas. Eventually, these became today's giant associations such as Visa® and MasterCard®.

Issuers soon discovered a dark side to the universality of transaction cards: they could be stolen and thieves could quickly run up immense charges against the card. Even consumers could go on a spree and quickly exceed their credit limit. Banks set up toll-free telephone numbers which merchants were required to call to get approval for transactions in excess of a "floor limit" (typically, about $50). Eventually, magnetic strips encoded with account information (e.g., the cardholder's name and the credit card number) were added to cards and simple, low-cost terminals were developed to read the cards, send transaction information and receive approval automatically. Today, virtually every time a customer presents a card to a store cashier, the transaction is reported to a central clearing facility and checked for approval in real-time.

In a typical card-based transaction, the customer presents her transaction card to the merchant. The merchant then swipes the customer's card through a reader terminal which reads from the card's magnetic strip the customer's name, account number and card expiration date. In the case of a mail order or a telephone order (referred to as "MOTO"), the merchant manually keys this information into the terminal.

The terminal contacts the merchant's bank (referred to as the acquiring or accepting bank) and provides details of the transaction including the customer's information and additional information about the merchant and the transaction. This additional information may include the merchant's identification code, type of business (e.g., Standard Industrial Classification or SIC), location, and the amount of the transaction.

The acquiring bank then contacts the bank that issued the customer's card (referred to as the issuing or settling bank), typically through a card association's private network, and provides the information about the transaction. The issuing bank examines the transaction, checking that it does not exceed the consumer's credit limit and performing other checks such as for abnormal transactions indicating possible theft.

Approval of a transaction also reserves a portion of the consumer's available credit line for that transaction. This helps prevent cases where a merchant submits a transaction to the issuing bank only to have it returned because the customer has used up her card's available credit line.

Actual transactions are batched together and forwarded nightly by the merchant to his acquiring bank. His bank account is credited with the amount of the transactions submitted, less a per-charge processing fee. The acquiring bank then sends batches of transactions to each issuing bank via the card association's private network and accounts are settled nightly between banks.

Sometimes the amount of a transaction may not be for the exact amount given when seeking authorization for the transaction. One example is restaurant charges, where customers add tips to the charge slip. To match transactions to approvals even if the amounts do not match, the multi-digit authorization code is used to key transactions to approvals.

In a similar vein, some authorizations may not be for actual charges, but rather for approval and confirmation that the cardholder will be able to pay a certain amount at a later time if needed. Examples include damage deposits against rentals and guaranteeing the ability to pay on checkout when registering at a hotel. For this reason, authorizations also have expiration dates (typically a week after issuance); if a matching transaction has not been submitted by the merchant by that time, the authorization expires and the amount is restored to the consumer's available line of credit.

Telephonic transaction authorization has brought a variety of important benefits to banks and merchants. The cardholder's available credit is instantaneously reduced by the amount of the purchase, making it difficult for the cardholder or a thief to exceed the charge or credit limit on the card. Banks can also track card usage patterns; abnormal usage (e.g., atypical purchases or a sudden flurry of purchases in a distant city) can signal a stolen card.

All transaction cards issued by a bank are directly linked to a specific account with specific characteristics (e.g., a specified credit limit). While duplicate cards may be obtained, the duplicate card functions exactly as the original card. This leads to consumers having to carry a multitude of cards, one for each of their various credit and debit accounts. In addition, card-based transactions are approved or denied by the card-issuing bank solely based upon criteria determined by the bank. Accordingly, the consumer has little or no control of the approval or denial of a specific transaction. Therefore, what is needed is a technique for providing to the consumer increased flexibility and control over the use of transaction cards for card-based transactions. Preferably, such a technique would not require the consumer to carry a multitude of transaction cards. What is further needed is a technique for providing to the consumer increased flexibility and control over debit and credit accounts used in connection with such card-based transactions. It is to these ends that the present invention is directed.

SUMMARY OF THE INVENTION

The invention is a system and method for consumer control over card-based transactions and associated accounts. An interface is provided between a merchant or the merchant's bank and the bank or banks at which the consumer has accounts for card-based transactions. The interface acts as an intermediary which is accessible to the consumer so that the consumer may place a variety of controls on card-based transactions.

A transaction card issued to the consumer may appear similar to a conventional credit card. However, the transaction card need not be backed directly by a line of credit, as is the case for a conventional credit card. Rather, transactions performed using the transaction card may be selectively linked to one or more lines of credit or debit accounts by the interface of the present invention. The selected line of credit or debit account may then be used to make the purchase. The consumer may access the interface to place a variety of controls on card-based transactions which the consumer previously was unable to do. Thus, by inserting the interface into the transaction, the consumer has increased control over the transaction.

The interface may be considered an electronic wallet which resides at a remote server and is accessible to a consumer via the Internet or via a telephone. The user places one or more actual credit or debit cards in the electronic wallet by entering the account information to the server. The consumer may also access the interface for making changes to the manner in which transactions are handled by the interface. Purchases using the transaction card are processed through the wallet as instructed by the consumer. For example, multiple transaction cards may be linked to a single credit account with each card having a different credit limit. As another example, each card may be restricted to a particular merchant. As yet another example, a consumer may link several credit and/or debit accounts to a single card; the consumer may pre-select criteria to be utilized for directing charges for a particular transaction to be applied the different accounts. As a further example, the consumer may enable or disable selected transaction cards or accounts by accessing the interface and without having to contact the account-issuing bank directly.

The consumer may also access the interface for receiving account information, such as a history of purchases and current account balances.

Accordingly, the present invention provides to the consumer previously unknown flexibility and control over the use of transaction cards for card-based transactions and over debit and credit accounts used in connection with such card-based transactions.

In accordance with an aspect of the invention, an interface between a merchant's bank and a bank at which a consumer has an account for conducting card-based transactions is provided. The interface is remotely accessible by the consumer for selectively restricting approval of a transaction.

In accordance with another aspect of the invention, a method of conducting a card-based transaction is provided. A card is presented to a merchant for a transaction. Information relating to the transaction is communicated from the merchant to an interface. At the interface, a determination is made whether to approve or deny the transaction based upon a criteria selected by the consumer. When the transaction is to be approved based upon the criteria selected by the consumer, information relating to the transaction is communicated from the interface to a bank at which the consumer has an account. Whether to approve or deny the transaction is also determined based upon predetermined criteria selected by the bank. Results of the determination whether to approve or deny the transaction are communicated to the merchant.

The criteria selected by the consumer for restricting approval of a transaction may include a restriction to a particular merchant, a restriction on the amount of the transaction, a restriction on a balance accrued for transactions during a period of time, or a restriction on a type of goods or services purchased. The card may be presented by a card user other than the consumer. The transaction may be consummated without the merchant receiving the identity of the consumer. The bank at which the consumer has the account may be selected from a plurality of banks at which the consumer has an account based upon an amount of the transaction, based upon a type of goods or services purchased during the transaction, an identity of the merchant, a current account balance. The bank at which the consumer has an account and the interface may each determine independently of the other whether to approve the transaction.

In accordance with another aspect of the invention, an interface between a merchant's bank and a bank at which a consumer has an account for conducting card-based transactions is provided. The interface is remotely accessible by the consumer for selectively directing a transaction to an account wherein the account to which the transaction is directed is identified from among a plurality of accounts held by the consumer based upon criteria selected by the consumer.

In accordance with a further aspect of the invention, a method of conducting a card-based transaction is provided. A card is presented to a merchant for a transaction. Information relating to the transaction is communicated from the merchant to an interface. At the interface, an account is identified from among a plurality of accounts held by the consumer to which the transaction is to be directed based upon criteria selected by the consumer. Information relating to the transaction is communicated from the interface to a bank at which the consumer has the identified account. Whether to approve or deny the transaction is determined based upon predetermined criteria selected by the bank. Results of the determination whether to approve or deny the transaction are communicated to the merchant.

The bank or account to which the transaction is directed may be identified based upon an amount of the transaction, a type of goods or services purchased, an identity of the merchant or a current account balance. The interface may include a web server for allowing the consumer to access the interface via the world wide web.

In accordance with yet another aspect of the invention, an interface between a merchant's bank and a bank at which a consumer has an account is provided. The interface directs card-based transactions made by the consumer using any of a plurality of cards to the account. The interface selectively restricts approval of a transaction made using one of the plurality of cards in accordance with a limitation on an amount of the transaction. The limitation for each of the plurality of cards is not necessarily being equal. The interface is accessible to the consumer for selecting the limitation for each of the plurality of cards. The interface may include a web server for allowing the consumer to access the interface via the world wide web.

In a further aspect of the invention, an interface between a merchant's bank and a bank at which a consumer has an account is provided. The interface directs card-based transactions made by the consumer using any of a plurality of cards to the account. The interface selectively restricts approval of a transaction made using one of the plurality of cards based upon whether the consumer has enabled or disabled the card being used. The interface is accessible to the consumer for selectively enabling or disabling each of the plurality of cards. The interface may include a web server for allowing the consumer to access the interface via the world wide web.

DETAILED DESCRIPTION OF A PREFERRED EMBODIMENT

Figure 1:
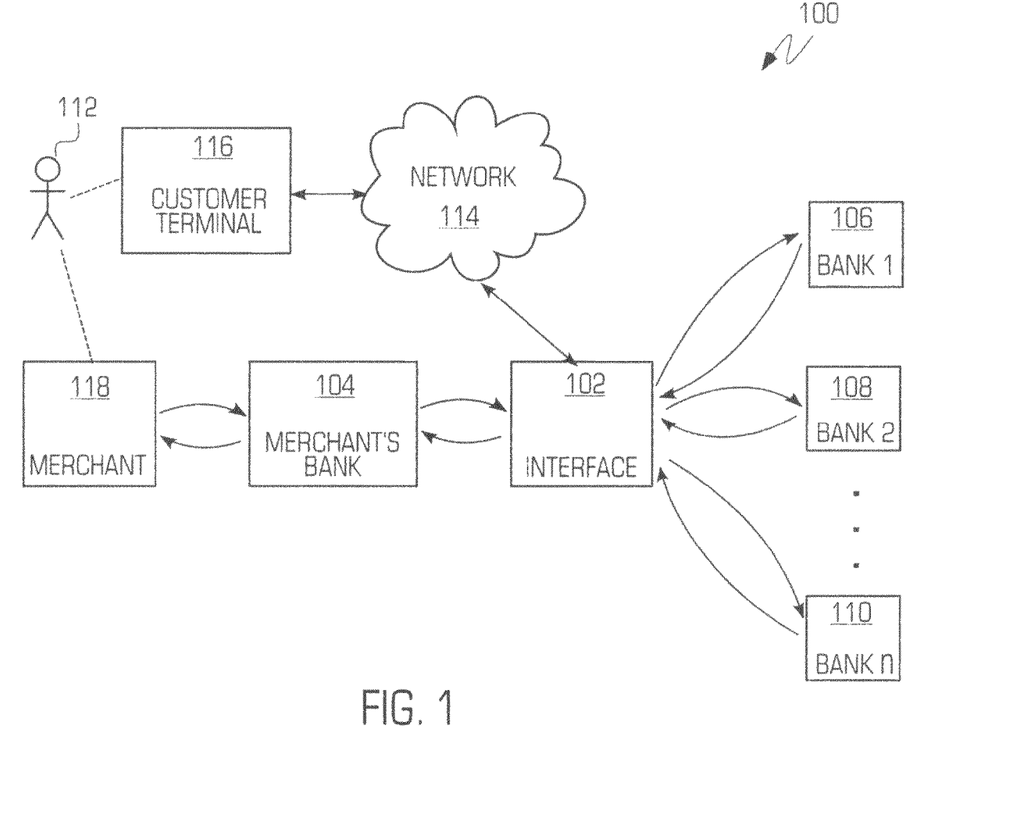
FIG. 1 illustrates a block schematic diagram of a system for card-based transactions including an interface in accordance with the present invention.

FIG. 1 illustrates a block schematic diagram of a system 100 for card-based transactions including an interface 102 in accordance with the present invention. As shown in FIG. 1, the interface 102 is positioned as an intermediary between a merchant's bank 104 and one or more account-issuing entities 106-110, such as credit- or debit-card issuing banks. As used herein, the term "bank" refers to an entity at which a consumer may have funds on deposit or which may issue credit to a consumer. The interface 102 communicates with the entities 106-110 for performing a variety of card-based transactions for a customer 112, such as automatic teller machine (ATM) transactions, debit, credit, charge, retail store, and entertainment card transactions.

The customer 112 may be an individual, a family, a business, a non-profit organization, a corporation or other type of entity. A large number of customers may subscribe to the services provided by the interface 102, while the interface 102 may interact with a large number of entities 106-110. Each customer may be charged a fee for use of the system 100, such as a monthly fee or a per transaction fee.

As an example of a card-based transaction using the interface 102, a transaction may be initiated by the consumer 112 making a purchase from a merchant 118. The interface 102 may also be used in any other transaction where a customer presents an account number and the transaction is then processed based on the account number. This includes purchases made by telephone order or via the Internet (i.e., "e-commerce").

One or more transaction cards issued to the consumer 112 may each appear similar to a conventional credit card. However, each transaction card need not be backed directly by a line of credit, as is the case for a conventional credit card. This means that the entities 106-110 may be distinct from the provider of the interface 102. However, the interface 102 may be utilized to selectively link transactions performed using a transaction card to one or more lines of credit or debit accounts issued by the entities 106-110. While a transaction card need not be backed directly by a line of credit, a transaction card may be backed directly by a line of credit. This means that the interface 102 may be provided by, or may be associated with, one or more of the entities 106-110. A variety of services may be provided by the multiple entities 106-110 via the interface 112. For example, if the customer 112 has a brokerage account, a variety of services may be provided by the broker. Such services may include, for example, a line of credit which may be provided or an automatic deduction from a debit account may occur for investment in a brokerage account.

The card number on the transaction card need have no direct connection to the customer's identification. Rather, many cards may be issued to the same customer. Such cards need not have the customer's name printed on them. In which case, the customer may consummate a transaction with a merchant anonymously (i.e., the merchant need not know the customer's name or identity). Furthermore, additional card numbers and/or short-lived and virtual cards may be issued. For example, a card number may be issued to a customer where there is no physical card. The card number may then be used to make purchases by telephone or via the Internet. The purchases may be made anonymously. Alternately, if she desires, the customer may provide her name or other identification to the merchant. Such a card number may be restricted to a single purchase or to a group of purchases (e.g., from a specified merchant and/or on a specified day).

The customer 112 may access the interface 102 in a variety of different ways for making changes and selections which control the behavior of the interface 102 in conducting the card-based transactions and for receiving information regarding the accounts. For this purpose, the customer terminal 116 may be accessed by the customer 112. The terminal 116 may include a personal computer system, a telephone or other device for accepting input from the customer 112 and providing information to the customer 112. The customer's input may be communicated from the terminal 116 to the interface 102 via the network 114.

In a preferred embodiment, the customer 112 accesses the interface 102 via a web site. In which case, the terminal 116 may include a personal computer system, while the network 114 includes the Internet (world wide web). For example, the consumer 112 may access her account information by providing her personal identification and a pre-assigned security code. The consumer 112 may then make selections and changes by interacting with the web site. In addition, the consumer 112 may be provided with selected and up-to-date status information regarding her various credit and debit accounts via the web site. For example, the consumer 112 may receive all of her previous account configuration selections, a transaction history and current balances for all of her accounts.

Alternately, the customer 112 may access the interface 102 via a telephone. In which case, the terminal 116 may include the telephone, while the network 114 includes a telephone network. The customer 112 may initiate a telephone call to the interface 102. Once a connection is established, the customer 112 enters her identification and security code via the telephone keypad. Requests for changes to the configuration of the interface 102 may be entered by the customer 112 navigating menus provided audibly and by the customer 112 making selections by pressing keys on the telephone keypad. Account information may also be audibly provided by to the consumer 112 via the telephone.

Figure 2:
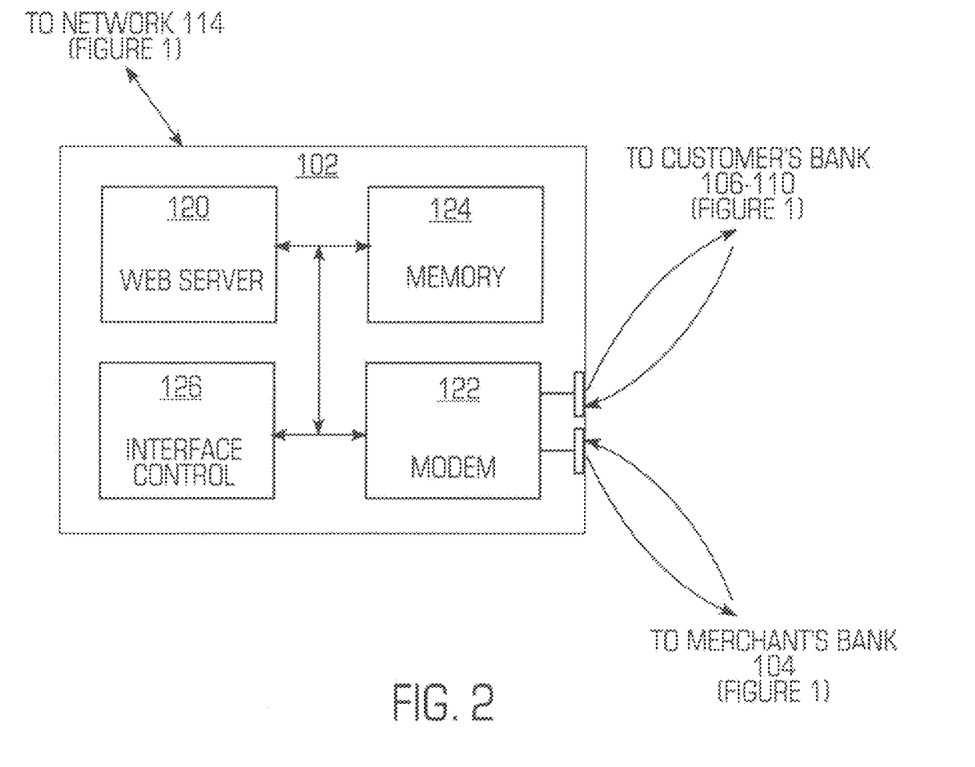
FIG. 2 illustrates the interface of FIG. 1 in more detail.

FIG. 2 illustrates the interface 102 of FIG. 1 in more detail. As shown in FIG. 2, the interface 102 may include a web server 120 for providing the web site which may be accessed by the consumer 112 (FIG. 1) via the network 114 (FIG. 1). The interface 102 may also include one or more telephonic modems 122 for communicating with the merchant's bank 104 (FIG. 1) and the customer's banks 106-110 (FIG. 1). For example, the modems 122 may provide direct private network connections or dial-up access. The modems 122 may also be utilized for providing telephonic access to the interface 102 by the customer 112 (FIG. 1).

A memory 124 may store account history information, such as balances for multiple subscribing customers' accounts, and configuration information, such as selections made by the consumers for their transaction cards and accounts. The memory 124 may also store software programs for execution by a control section 126.

The control section 126 may include, for example, a general purpose processor which controls operation of the interface 102. For example, the control section 126 may update account balance information stored in the memory 122 in response to transactions received from account-issuing entities 106-110 via the modem 122. In addition, the control section 126 may update account configuration information in response to input received from the consumer 112 (FIG. 1) via the web server 120 or modem 122 and may provide account information to the customer 112 via the web server 120 or modem 122 in response to requests by the consumer 112.

Figure 3:
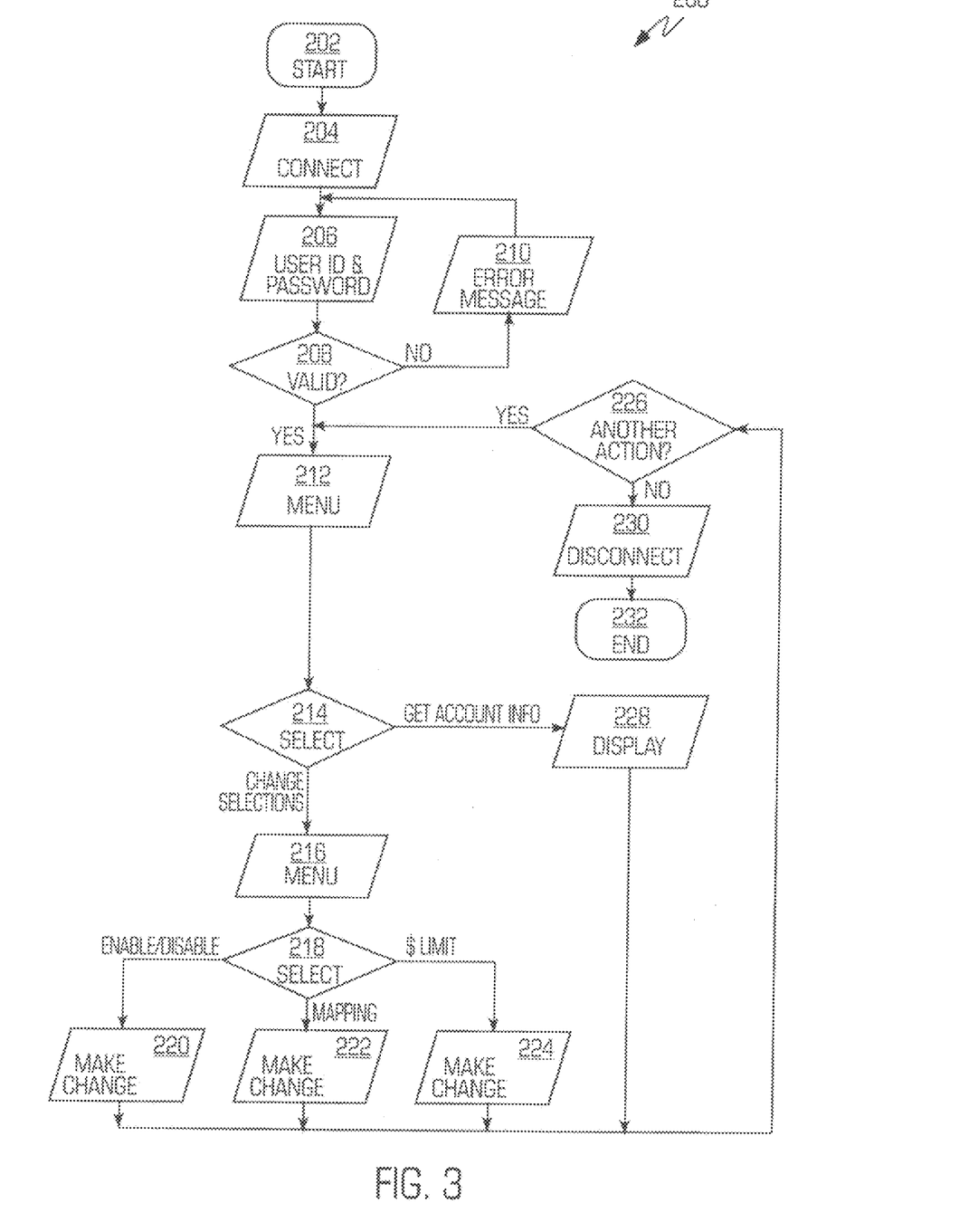
FIG. 3 illustrates a flow diagram by which a customer may access the interface of FIGS. 1-2 for making selections and obtaining account information.

By accessing the interface 102, the customer 112 may obtain account information and make selections for controlling the behavior of the interface 102 for conducting card-based transactions. FIG. 3 illustrates an exemplary flow diagram 200 for accessing the interface 102 by the customer 112. Program flow begins in a start state 202. From the start state 202, program flow moves to a state 204 where a connection is made to the interface 102 (FIG. 1). This connection may be made, for example, by the customer 112 accessing an appropriate web site of the Internet via a secure socket layer (SSL) protocol or by the customer 112 initiating a telephone call.

Next, program flow moves to a state 204 where the customer provides his or her user identification and security code or password. This information may be typed by the customer 112 assuming the customer is using a computer keyboard. Otherwise, assuming the customer 112 is using a telephone, this information may be keyed using a telephone keypad. Alternately, the customer 112 may provide her information by speaking into the telephone. In which case, speech recognition may be performed to interpret this spoken input.

Verification of the customer's identification and security code is then performed by the interface 102 (FIGS. 1-2) to ensure that no unauthorized person is attempting to access the customer's accounts. Accordingly, from the state 206, program flow moves to a state 208. In the state 208, the customer's identification is cross-referenced to the customer's security code. Assuming the identification and security code do not match, then program flow moves to a state 210 where an error message is provided indicating that there is not a match. From the state 210, program flow may return to the state 206 to provide another attempt at entering a matching the identification with the security code. After a limited number of unsuccessful attempts, the interface 102 may not accept any additional attempts until some other action is taken, such as calling a customer service representative.

Assuming that in the state 208, there is a match, this indicates that the person accessing the interface 102 is, in fact, the identified customer 112 and is to be given access to her accounts. Then, program flow moves from the state 208 to a state 212.

In the state 212, the customer 112 may be presented with a menu of options to choose from. For example, the options may include obtaining account and configuration information or changing account configuration. Assuming the customer 112 is using web access, then the menu can appear as a list of links which the customer 112 may select by simply using her computer system mouse. Alternately, assuming the customer 112 is using a telephone to access the interface 102, the menu can be presented to the customer 112 audibly along with the identification of an appropriate key of the telephone keypad to be pressed for each selection. Assuming the customer 112 has multiple credit or debit accounts or multiple transaction cards, the customer 112 may also identify the particular account or transaction card for which configuration changes are to be made or information obtained. Then, program flow moves to a state 214 where the customer 112 selects from the options presented in the state 212.

Assuming that in the state 214, the customer 112 (FIG. 1) selects the option of changing the configuration of the interface 102 (FIGS. 1-2) for a particular account or transaction card, program flow moves to a state 216. In the state 216, the customer 112 may be presented with a menu of configuration options. The options may be presented in a similar manner to those presented in the state 212 and may include, for example, enabling or disabling a particular card or account, changing rules for mapping a particular transaction to a particular account and changing dollar amount limits. The dollar amount limits may apply to a particular card, to particular transactions to be made using the card, or to a particular account held by the customer 112.

From the state 216 program flow moves to a state 218 where the customer makes a selection. If the customer selects enabling or disabling a particular card, account or transaction, program flow moves to a state 220. In the state 220, the customer identifies the card, the account, the transaction or the merchant that is to be enabled or disabled and selects the action to be taken (i.e. enable or disable).

As an example of configuring the interface 102 in this manner, a card may be restricted to a specific merchant. That is, the card could be disabled for all merchants except one or more specified merchants. This makes issuance of a company transaction card, for example to truck drivers for purchasing fuel at a specific location, easy and simple. Loss, theft and/or damage of the card will not have major implications. Also, a card may be restricted to a specified type or types of goods or services. For example, a parent may prevent a card given to a child from being used to purchase anything other than automobile repairs and school supplies. As another example, when a transaction card is lost, it can be turned "off" (i.e. disabled) instead of being reported stolen. If the card is later found, it can be turned "on" (i.e. enabled) again. As a further example, a traveler could choose to carry several "off" transaction cards in his luggage in the event he looses his wallet. In case of theft, the "off" cards are worthless. In the event the traveler loses his wallet, the traveler can turn "on" a card trivially at the same time as turning "off" the card(s) in his wallet.

Banks and stores could offer courtesy cards which could be "turned on" for a short period of time to perform purchases and then "turned off" at the end of the shopping trip.

Another option is for the customer 112 to require that all transactions made using a particular transaction card would require the customer's authorization directly to the interface 102. To accomplish this, the user logs into the interface 102 via the Internet. Transaction requests may then appear on the customer's 112 display screen in real time. The customer 112 can then choose to allow or disallow a specific transaction. This feature may also be used to override specific limitations previously selected by the customer 112.

Alternately, if the customer 112 selects to change the mapping rules, then program flow moves from the state 216 to a state 222. In the state 222, the customer 112 identifies the card or account for which the mapping rules are to be changed and identifies the change the customer 112 desires to make to the rules pertaining to the selected card or account.

For example, by making appropriate selections of the mapping rules, multiple transaction cards may be linked to a single credit account with each card having a different credit limit (the credit limits may be set by the customer 112 (FIG. 1), as explained below in reference to a state 224). This may be desired, for example, so that a parent may link her own card to the same credit account as is linked to a card provided to a child. The child's card may be have a different (e.g., lower) credit limit and/or may be limited to a particular merchant or merchants selected by the parent. The parent may change or remove these restrictions by accessing the interface 102 (FIGS. 1-2) and without having to alter the terms of the account with the credit-issuing bank. This allows a parent to control a child's unacceptable purchases without having to prevent all of the child's purchases. Accordingly, a card may be used by someone other than the person to whom the card or associated credit or debit account was issued, however, the person to whom the card was issued may restrict use of the card as she sees fit.

As another example, a consumer 112 may link several credit and/or debit accounts to a single card using the interface 102. The consumer 112 may pre-select criteria to be utilized for directing charges for a particular transaction to be applied the different accounts. For example, purchases made from a particular department store may be directed to a credit account issued by that store. Alternately, purchases which exceed a dollar amount specified by the consumer may be directed to an account which has a comparatively low interest rate, with the expectation that such charges may be paid down over several payment periods. Conversely, lower dollar amount purchases may be directed toward an account which provides a greater benefit, such as airline miles, with the expectation that the charge will be paid off without accruing significant interest charges. As a further example, purchases of specified type of goods or services may directed to a specified account. For example, necessities, such as groceries and gasoline, may be directed to a debit account from which the purchase amounts are immediately deducted.

As another example, mapping rules may be selected by the customer 112 which would direct charges to an alternate account if the credit limit set by an issuing bank is exceeded. Thus, a customer who has multiple lines of credit may be provided an effective credit limit equal to the sum of the outstanding limits across multiple credit accounts. In addition, if the customer has a credit line from a credit card issuer which is not accepted by a particular merchant (e.g., a DISCOVER™ card may not be accepted by all merchants), the interface 102 may direct charges to that account in a manner which is transparent to the merchant. As a result, credit cards with bonus programs such as frequent flyer mileage can receive all or most transactions even if issued by an issuer which is not well accepted by all merchants.

Further, transactions may redirected after the fact. By processing a new charge against one account and a refund against another account from which a prior charge is to be removed, charges may be effectively moved from one account to the other having been incurred.

In the state 214, if the customer selects to change a dollar limit, which when exceeded will result in a denial of the proposed transaction, program flow moves from the state 218 to the state 224. In the state 224, the customer identifies the card, the account or the transaction for which the dollar limit is to be changed and the new dollar limit that is to be placed into effect for the identified card, account or transaction.

As example of this feature, the user may wish to limit the total amount of purchases made using a particular account or transaction card. The limit may apply to the total balance for a card or account regardless of the time interval over which the charges accumulated. As mentioned, an example is where a parent wishes to issue a transaction card to child. Initially, the parent may set the card to have a low (or $0.00) limit. Then, when a child (e.g., attending college out of town) calls for additional money, the parent can then access the interface 102 (FIGS. 1-2) and quickly raise the child's limit to a higher amount. Alternately, the limit may apply to a specified interval of time, such as a month, a week or a day. Thus, for example, the parent may issue the card to the child such that the child is limited to a specified total of purchases each month.

Additional enhancements include an ability for the customer 112 (FIG. 1) to automatically make payments or contributions. For example, the customer 112 may select to have the interface 102 apply funds toward a mortgage held by one of the entities 106-110 (FIG. 1). Alternately, the customer 112 may select to have the interface periodically make fund transfers to a retirement or savings account.

From any of the states 220, 222 or 224, program flow moves to a state 226. In the state 226, the customer indicates whether she would like to make additional changes or obtain additional information. Assuming she does, program flow returns from the state 226 to the 212 where the user is again presented with a menu of options.

Returning to the state 214, assuming that the customer chooses to obtain account information, program flow moves from the state 214 to a state 228. In the state 228, the customer may be provided with additional options for more particularly specifying which information regarding her accounts and their current configuration that she would like to receive. Then, the customer is provided with selected information. The account information may include a list of card-based transactions of the customer and current account balances. For example, the configuration information may include selections made in each for the states 220-224.

For example, several fields may be provided for each charge record which the customer 112 (FIG. 1) may use to make a permanent annotation regarding a specific charge. This could be used later to help the customer 112 determine the purpose of the charge and, perhaps, as a reminder of its tax deductible status. As an another example, a plurality of different queries may be made to the data stored in the memory 124 (FIG. 2) to produce expense reports and other types of analysis which might be useful to the customer 112. Further, the customer 112 could review month-to-date expenditures, etc. at any point in time. This "middle of the month" analysis could be quite useful during times of financial stress. Historic information may be maintained on line indefinitely which would make recovery of records from previous years easy.

Returning to the state 226, assuming that the customer 112 has completed making any desired changes and does not desire to receive any additional information, program flow moves from the state 226 to a state 230. In the state 230, the connection between the customer 112 and the interface 102 (FIG. 1) is terminated. This may include, for example, terminating the customer's access to the web site or disconnecting the customer's telephone call, as appropriate.

Once the customer 112 has configured the interface 102 in accordance with her preferences, the customer 112 may then make purchases using her transaction card or cards. The interface 102 then ensures that the transactions are consummated in accordance with the customer's preferences. More particularly, FIG. 4 illustrates a flow diagram 300 by which a card-based transaction may be conducted via the system 100 illustrated in FIG. 1.

Figure 4:
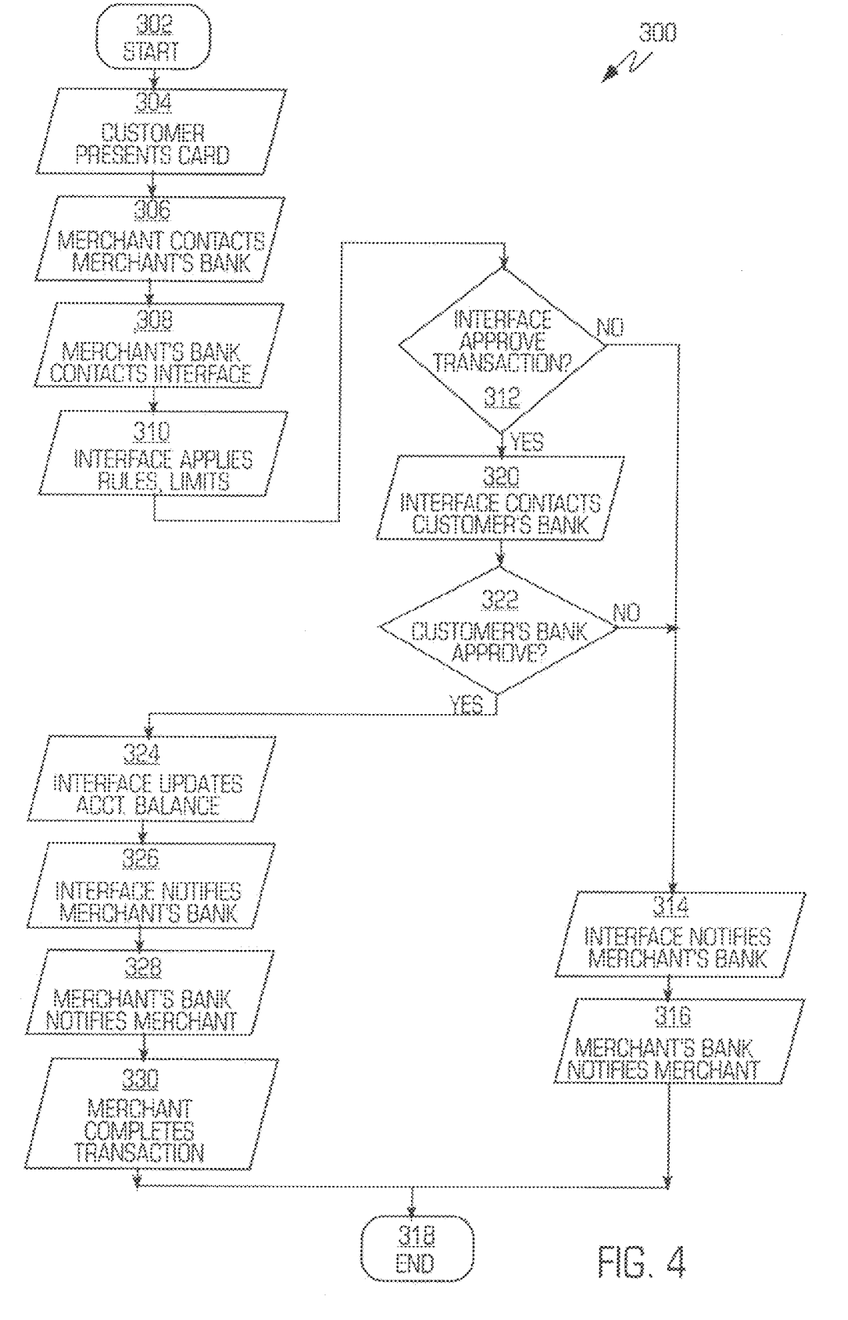
FIG. 4 illustrates a flow diagram by which a card-based transaction may be conducted via the interface of FIGS. 1-2.

Referring to FIG. 4, program flow begins in a start state 302. From the state 302, program flow moves to a state 304. In the state 304, the customer 112 (FIG. 1) presents her transaction card to a merchant 118 (FIG. 1). For example, the customer 112 may wish to purchase goods or services from the merchant 118. While the customer 112 may present her card to a store clerk at a retail store, the customer 112 may alternately provide card information, such as her name, card number and expiration date to the merchant by mail, over the telephone or via the Internet.

Program flow then moves to a state 306 where the merchant 118 then processes the transaction. This may accomplished by the store clerk swiping the customer's card through a card reader terminal or by the clerk manually entering information from the card into the terminal. In addition, the merchant 118 contacts the merchant's bank 104 (FIG. 1). This may be accomplished by the merchant's terminal automatically dialing a toll-free telephone number established by the merchant's bank for this purpose, or by the store clerk dialing a customer service telephone number of the merchant's bank 104. Once a connection between the merchant 118 and the merchant's bank 104 is established, the merchant 118 may provide the bank 104 with the card information, the merchant's identification and the dollar amount of the transaction.

Next, program flow moves to a state 308. In the state 308, the merchant's bank 104 (FIG. 1) contacts the interface 102 (FIG. 1). This may be accomplished, for example, by the merchant's bank 104 initiating a toll-free telephone call to the interface 102 via the modems 122 (FIG. 2) of the interface 102. So that the merchant's bank 104 contacts the interface 102, rather than some other entity, such as an account-issuing bank, the transaction card may be assigned an appropriate bank identification number (BIN). For example, the BIN number may be the first six numbers embossed on the transaction card. The BIN number may identify the interface 102 to the merchant's bank 104 as the appropriate entity to contact for approval of the transaction.

Once contact is made, the merchant's bank 104 provides to the interface 102 information relating to the transaction, such as the card information, the merchant's identification and the dollar amount of the transaction.

From the state 310, program flow moves to a state 312. In the state 312, the interface 102 (FIG. 1) applies the customer's configuration selections to the transaction. These selections may be stored in the memory 124 (FIG. 2) of the interface 102 and may have been made by the customer interacting with the interface 102 as shown and described with reference to FIG. 3. For example, the interface 102 may determine whether any rule was pre-selected by the customer for mapping the current transaction to a particular account. If there is any such rule, then the interface 102 applies the rule. For example, assuming that the customer has configured the interface 102 to direction all transactions for less than $50 to a particular credit account, the interface determines whether the current transaction is under $50.

Also in the state 310, the interface 102 may determine whether any dollar amount limitations were pre-selected by the customer. If such a limitation was selected, the interface 102 determines whether approval of the current transaction would exceed the applicable limit. Further, the interface 102 determines whether any other limitation or rule may apply to the transaction, such as a restriction placed on the identity of the merchant 118.

From the state 310, program flow moves to a state 312. In the state 312, a determination is made by the interface 102 as whether the current transaction should be approved based upon the rules and limitations applied in the state 310.

If the transaction is denied by the interface 102, program flow moves from the state 312 to a state 314. In the state 314, the interface 102 notifies the merchant's bank 104 (FIG. 1) of the denial. This may be accomplished, for example, by the interface 102 communicating the denial to the merchant's bank 104 via the telephone call initiated by the merchant's bank 104 in the state 308. Alternately, a separate telephone call may be initiated by the interface 102. In addition, the interface 102 preferably also notifies the customer 112 (FIG. 1) of the denial, such as by providing message to the customer 112 the next time the customer accesses the interface 102 via the web site or by telephone. Alternately, the interface 102 may notify the customer of the denial by sending an e-mail message to the customer 112 at an e-mail address previously specified by the customer 112 or by an automated telephone call placed to customer 112.

Program flow then moves to a state 316 where the merchant's bank 104 notifies the merchant 118 (FIG. 1) of the denial. This may be accomplished, for example, by the merchant's bank 104 communicating the denial to the merchant 112 via the telephone call initiated by the merchant 118 in the state 306. In response, the store clerk may notify the customer 112 and ask for another form of payment.

However, if the transaction is accepted by the interface 102 in the state 312, then program flow moves from the state 312 to a state 322. In the state 322, the interface 102 contacts the appropriate one of the banks 106-110 (FIG. 1) at which the customer 112 has an account. This may be accomplished by the interface 102 initiating a telephone call to a toll-free telephone number of the one of the banks 106-110 via the modems 122 (FIG. 2) of the interface 102. The appropriate one of the banks 106-110 is selected based upon the mapping rules applied by the interface 102 in the state 310. Once the connection is made, the interface 102 may then provide to the bank information relating to the customer's account at the bank, such as the account number. This account information may have previously been stored in the memory 124 (FIG. 2) of the interface 102. The interface 102 may also provide to the customer's bank information relating to the current transaction, such as the merchant's identification and the dollar amount of the transaction.

From the state 320, program flow moves to the state 322. In the state 322, the one of the banks 106-110 which was contacted in the state 320 may determine whether to accept or decline the current transaction. This may be accomplished in a conventional manner as though the customer's bank was contacted directly by the merchant's bank 104 (FIG. 1). Thus, the customer's bank need only determine whether the transaction would cause the customer's balance at that bank to exceed the customer's credit limit issued by that bank or cause her debit account at that bank to fall below zero.

Preferably, the appropriate one of the account-issuing banks 106-110 also checks each transaction for fraudulent activity, as would be done for a conventional credit-card transaction. Accordingly, the interface 102 is relieved of responsibility for this task. However, the interface 102 may also be provided with fraud-checking ability. In which case, the customer 112 may control the type of checks for fraudulent activity which are performed by the interface 102. For example, the customer 112 may request notification, or even disablement of a transaction card, when an attempt is made to make a purchase at a location which is further than a selected distance from the customer's home.

If the transaction is denied in the state 322, program flow may move from the state 322 to the state 314, where the merchant's bank 104 (FIG. 1) and the merchant 118 (FIG. 1) are notified of the denial, as explained above in reference to the states 314 and 316. Because an account-issuing bank may deny a transaction for its own reasons, the interface 102 preferably does not allow a transaction to proceed unless the appropriate one of the account-issuing banks 106-110 (FIG. 1) also approves the transaction.

However, if the transaction is accepted by the account-issuing bank in the state 322, then program flow moves from the state 322 to a state 324. In the state 324, the interface 102 updates the customer's account balance information to reflect the current transaction. This may be accomplished by the interface 102 updating balance information stored in the memory 124 (FIG. 2).

Then, program flow moves to a state 326 where the interface 102 (FIGS. 1-2) notifies the merchant's bank 104 (FIG. 1) that the transaction is approved. This may be accomplished, for example, by the interface 102 communicating the acceptance to the merchant's bank 104 via the telephone call initiated by the merchant's bank in the state 308. Alternately, a separate telephone call may be initiated by the interface 102.

From the state 326, program flow moves to a state 328. In the state 328, the merchant's bank 104 (FIG. 1) notifies the merchant 118 (FIG. 1) that the transaction is approved. This may be accomplished for example, by the merchant's bank 104 communicating the acceptance to the merchant 118 via the telephone call initiated by the merchant in the state 306. Alternately, a separate telephone call may be initiated by the merchant's bank 104.

Program then flow moves to a state 330 where the merchant completes the transaction. Accordingly, the merchant may present the customer with her purchases along with a credit slip for the customer's signature. From the state 330, program flow terminates in the end state 318.

What is claimed is:

1. A computing device executing instructions for generating an interface to facilitate consumer control over a transaction, comprising:
   a memory storing consumer transaction instructions and account information for a first transaction accepting account and a plurality of transaction execution accounts linked to the first transaction accepting account; and
   a processor directing a transaction from the first transaction accepting account to one of the plurality of transaction execution accounts,
   wherein the transaction execution account to which the transaction is directed is selected based on the consumer transaction instructions.

2. The computing device of claim 1, wherein the transaction execution account to which the transaction is directed is selected from the group consisting of: line of credit, debit, brokerage, credit card and savings.

3. The computing device of claim 1, further comprising a modem for allowing transactions via a telephone connection.

4. The computing device of claim 1, wherein the consumer transaction instructions are based upon an amount of the transaction.

5. The computing device of claim 1, wherein the consumer transaction instructions are based upon a type of goods or services purchased.

6. The computing device of claim 1, wherein the consumer transaction instructions are based upon an identity of the merchant.

7. The computing device of claim 1, wherein the consumer transaction instructions comprise selecting one of the transaction execution accounts based upon a current account balance.

8. The computing device of claim 1, further comprising a web server for allowing transactions via an Internet connection.

* * * * *